United States Patent
Basumotari et al.

(10) Patent No.: US 11,069,253 B2
(45) Date of Patent: Jul. 20, 2021

(54) METHOD AND SYSTEM FOR LANGUAGE SKILL ASSESSMENT AND DEVELOPMENT

(71) Applicant: Tata Consultancy Services Limited, Mumbai (IN)

(72) Inventors: Mridul Basumotari, Thane (IN); Sujit Devkar, Thane (IN); Sylvan Lobo, Thane (IN); Pankaj Harish Doke, Thane (IN); Sachin Sarawgi, Thane (IN); Sanjay Madhukar Kimbahune, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 407 days.

(21) Appl. No.: 15/840,373

(22) Filed: Dec. 13, 2017

(65) Prior Publication Data

US 2018/0190141 A1 Jul. 5, 2018

(30) Foreign Application Priority Data

Dec. 29, 2016 (IN) .............................. 201621044917

(51) Int. Cl.
*G09B 7/00* (2006.01)
*G09B 7/04* (2006.01)
*G09B 19/00* (2006.01)
*G09B 19/04* (2006.01)
*G06F 40/117* (2020.01)
*G06F 40/211* (2020.01)
(Continued)

(52) U.S. Cl.
CPC .............. *G09B 7/04* (2013.01); *G06F 40/117* (2020.01); *G06F 40/211* (2020.01); *G06F 40/253* (2020.01); *G09B 5/12* (2013.01); *G09B 19/00* (2013.01); *G09B 19/04* (2013.01); *G09B 19/06* (2013.01)

(58) Field of Classification Search
CPC ........... G09B 7/04; G09B 19/06; G09B 19/08
See application file for complete search history.

(56) References Cited

U.S. PATENT DOCUMENTS

| | | | | | |
|---|---|---|---|---|---|
| 6,144,838 | A | * | 11/2000 | Sheehan | G09B 7/02 434/118 |
| 2003/0028378 | A1 | * | 2/2003 | August | G09B 5/04 704/260 |

(Continued)

OTHER PUBLICATIONS

Litman, D. "Natural Language Processing for Enhancing Teaching and Learning," *Proceedings of the Thirtieth AAAI Conference on Artificial intelligence (AAAI-16)*, Feb, 12-17, 2015, Phoenix, AZ; pp. 4170-4176.

*Primary Examiner* — Peter R Egloff
(74) *Attorney, Agent, or Firm* — Finnegan, Henderson, Farabow, Garrett & Dunner, LLP

(57) ABSTRACT

This disclosure relates generally to language processing systems, and more particularly to a method and system for language development of a user. In one embodiment, the system generates customized exercise for a user, based on a language model relevant to a language being learnt by the user. The system further collects user response to the customized exercise, and in terms of the user response, determines a current skill level of the user. Further, based on the determined skill level of the user, a skill gap is identified. The system then determines recommendations to improve language skills of the user, and to reduce/eliminate the skill gap.

5 Claims, 5 Drawing Sheets

(51) Int. Cl.
*G06F 40/253* (2020.01)
*G09B 5/12* (2006.01)
*G09B 19/06* (2006.01)

(56) References Cited

U.S. PATENT DOCUMENTS

| | | |
|---|---|---|
| 2006/0046237 A1 | 3/2006 | Griffin et al. |
| 2006/0141425 A1* | 6/2006 | De Ley ................ G09B 19/06 434/169 |
| 2008/0261194 A1 | 10/2008 | Hilton |
| 2009/0087822 A1 | 4/2009 | Stanton et al. |
| 2013/0124203 A1 | 5/2013 | Scoggins, II et al. |
| 2015/0364049 A1 | 12/2015 | Smith |

* cited by examiner

METHOD AND SYSTEM FOR LANGUAGE SKILL ASSESSMENT AND DEVELOPMENT

PRIORITY CLAIM

This U.S. patent application claims priority under 35 U.S.C. § 119 to: India Application No. 201621044917, filed on 2016 Dec. 29. The entire contents of the aforementioned application are incorporated herein by reference.

TECHNICAL FIELD

This disclosure relates generally to language processing systems, and more particularly to a method and system for language development of a user.

BACKGROUND

Language skill assessment is a very subjective process. For example, assume that a teacher in a school is handling students, and the teacher has to assess English language skills of all the students. As the language supports different syntaxes and styles, assessment turns out to be inefficient. This is because the teacher assesses language skills of the students based on own language skills, style of teaching, and competencies. So some of the students who have similar language styles as of the teacher may end up receiving good comments, whereas the students who have correct but a different type of language style may end up receiving not so good comments. As the teacher may plan teaching activities based on such assessments, such subjectivities would affect quality of feedback being received by the students. First/Local/Native language may have an effect or may influence the constructs of a second language for any person. Thus, grammatical errors are a result of ambiguities/confusions in understanding of the parts of speech and the syntax of the language being learnt.

The inventors here have recognized several technical problems with such conventional systems, as explained below. Some of the language assessment systems that are being used currently rely on parameters such as a user's speed of performing a task, speed of language flow, efficiency and so on. However, the aforementioned factors may not be consistent for any user being considered, hence can adversely affect efficiency of results. Further, many of the existing language assessment systems require user inputs and intervention at various stages of the assessment process, which in turn affects speed and accuracy with which the data is being processed by the systems.

SUMMARY

Embodiments of the present disclosure present technological improvements as solutions to one or more of the above-mentioned technical problems recognized by the inventors in conventional systems. For example, in one embodiment, a language processing system for language development of a user is provided. The language processing system includes a hardware processor; and a storage medium comprising a plurality of instructions. The plurality of instructions causing the hardware processor to determine dynamically, a current skill level of the user, using a cognitive spatial distance measurement, by an assessment module of the language processing system. Further, a skill gap of the user is detected by the assessment module, wherein the skill gap is detected in terms of the determined current skill level and a reference baseline of skill level. Further, at least one recommendation for language improvement of the user is provided by a recommendation module of the language processing system, wherein the at least one recommendation is determined based on the detected skill gap and a language model, wherein the language model is specific to the language being learnt by the user.

In another embodiment, a processor-implemented method for language development of a user is provided. In this method, via one or more hardware processors, a current skill level of the user is dynamically determined using a cognitive spatial distance measurement. Further, a skill gap of the user is detected in terms of the determined current skill level and a reference baseline of skill level. Further, at least one recommendation for language improvement of the user is provided, wherein the at least one recommendation is determined based on the detected skill gap and a language model, wherein the language model is specific to the language being learnt by the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
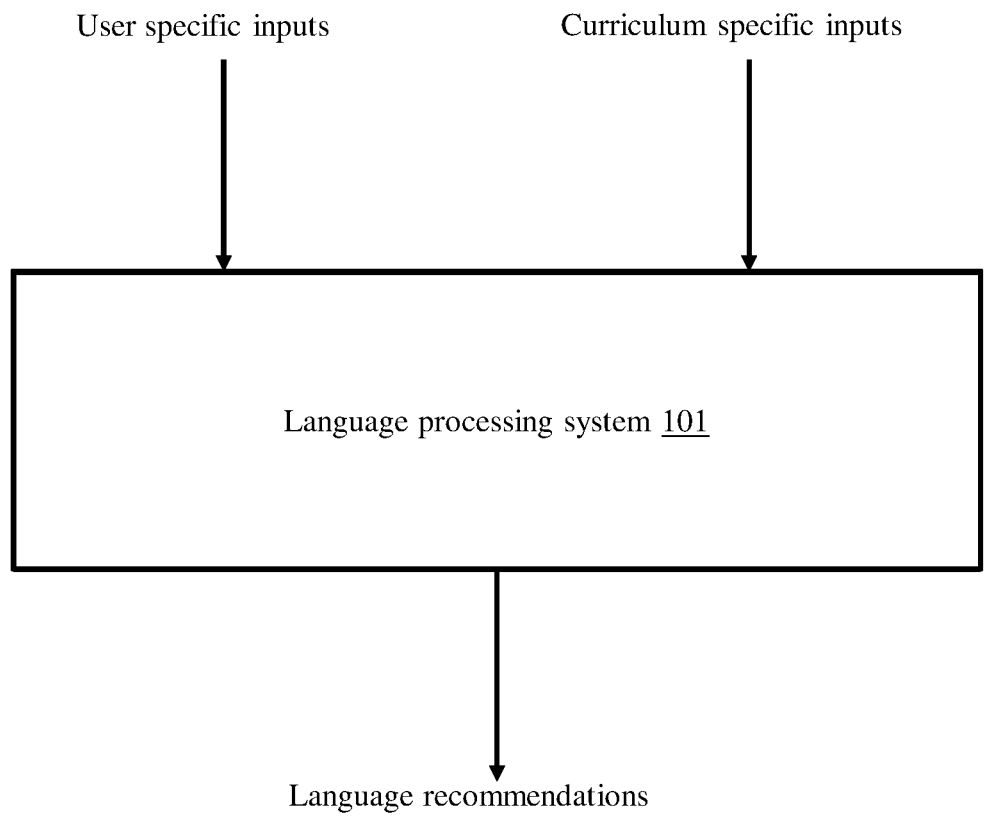
FIG. 1 is a block diagram of a language processing system for assessing language skills of a user and for generating customized recommendations for language improvement of the user, according to some embodiments of the present disclosure.

FIG. 1 is a block diagram of a language processing system for assessing language skills of a user and for generating customized recommendations for language improvement of the user, according to some embodiments of the present disclosure. The language processing system 101 is configured to perform a language skill assessment in which language skills of one or more users is assessed based on statically as well as dynamically collected data. The language processing system 101 is further configured to provide at least one recommendation to improve language skills of the at least one user to match the language skills to match a reference baseline of skill level.

The language processing system 101, as part of the language skill assessment, builds a language model based on information pertaining to the language being learnt by the user, at least one topic relevant to the user. Here the term 'topic' can refer to entire curriculum that is relevant to the user. For example, to analyze English language skills of a user (a student in this scenario) who is in 10th standard, the entire 10th Standard English curriculum is used to construct the corresponding language model. The language model thus constructed includes Parts of Speech (POS), sentence structure, sentence syntax, type of sentence (simple, intermediate, and complex, as per pre-set criteria), and tagger in a plurality of sentences from the curriculum considered, specific to the language being learnt by the user (in this example, English). Similarly, if the language processing system 101 is being used to improve Sanskrit language skills of the user, then the language model being used will be in accordance with Sanskrit language literature. The language specific rules, along with the curriculum and other related data, form the language model. In another embodiment, the language model further includes information pertaining to previous exercises and the corresponding user responses such that mistakes made by the user in the previous exercises are considered while generating recommendations for language improvement of the user. The language model can further involve location information pertaining to data being collected and stored in a memory module associated with the language processing system 101 the language model is further used to generate one or more exercises customized for a user, in order to perform language assessment for that user. In an embodiment, the exercise is customized at a user level, which improves result of skill assessment. The language model is further used to generate, for each exercise generated, a reference baseline of skill level, wherein the reference baseline of skill level indicates an ideal response to the customized exercise generated. In various embodiments, the ideal response is in line with the language specific rules that form the language model. For example, assume that the exercise required user response in the form of a sentence. In that case, a sentence that has been stored as the 'ideal response' obeys all language specific rules that form the language model. Further, the reference baseline of skill level includes at least one of Parts of Speech (POS), sentence structure, sentence syntax, type of sentence (simple, intermediate, and complex, as per pre-set criteria), and tagger corresponding to a plurality of sentences that form the customized exercise.

After building the language model, in order to perform the language assessment, the language processing system 101 generates the customized exercise, and provides the same to the user, using a suitable interface. The user is provided with one or more options to interact with the language processing system 101, using a suitable interface, and provide response for the customized exercise, to the language processing system 101. The language processing system 101 then compares the user response to the exercise with a reference baseline of skill level for that particular exercise, and quantifies current skill level of the user in light of the comparison. The language processing system 101 further determines a skill gap as the extent to which the current skill level of the user is to be improved to match with the reference baseline of skill level.

The language processing system 101 further generates, based on the determined skill gap and the language model, at least one recommendation for improving language skills of the user and to eliminate/reduce the determined skill gap. Further, personalized content is created and provided to the user, in response to the determined skill gap, as a learning module, to overcome the skill gap. Periodic assessments can be performed to determine whether the recommendations provided are improving language skills of the user. In that scenario, the language processing system 101 can compare user response to latest exercise with user response at least one previously given exercise, and determine improvements. The language processing system 101 can be configured to use suitable Natural Language Processing techniques for data processing associated with the language development process. In various embodiments, the language processing system can be deployed completely on a cloud based network and/or locally on the client device. In another embodiment, the deployment can be done simultaneously on a cloud network and the local client device, with various functions associated with the language assessment and improvement distributed among components in the cloud and local client device.

Figure 2:
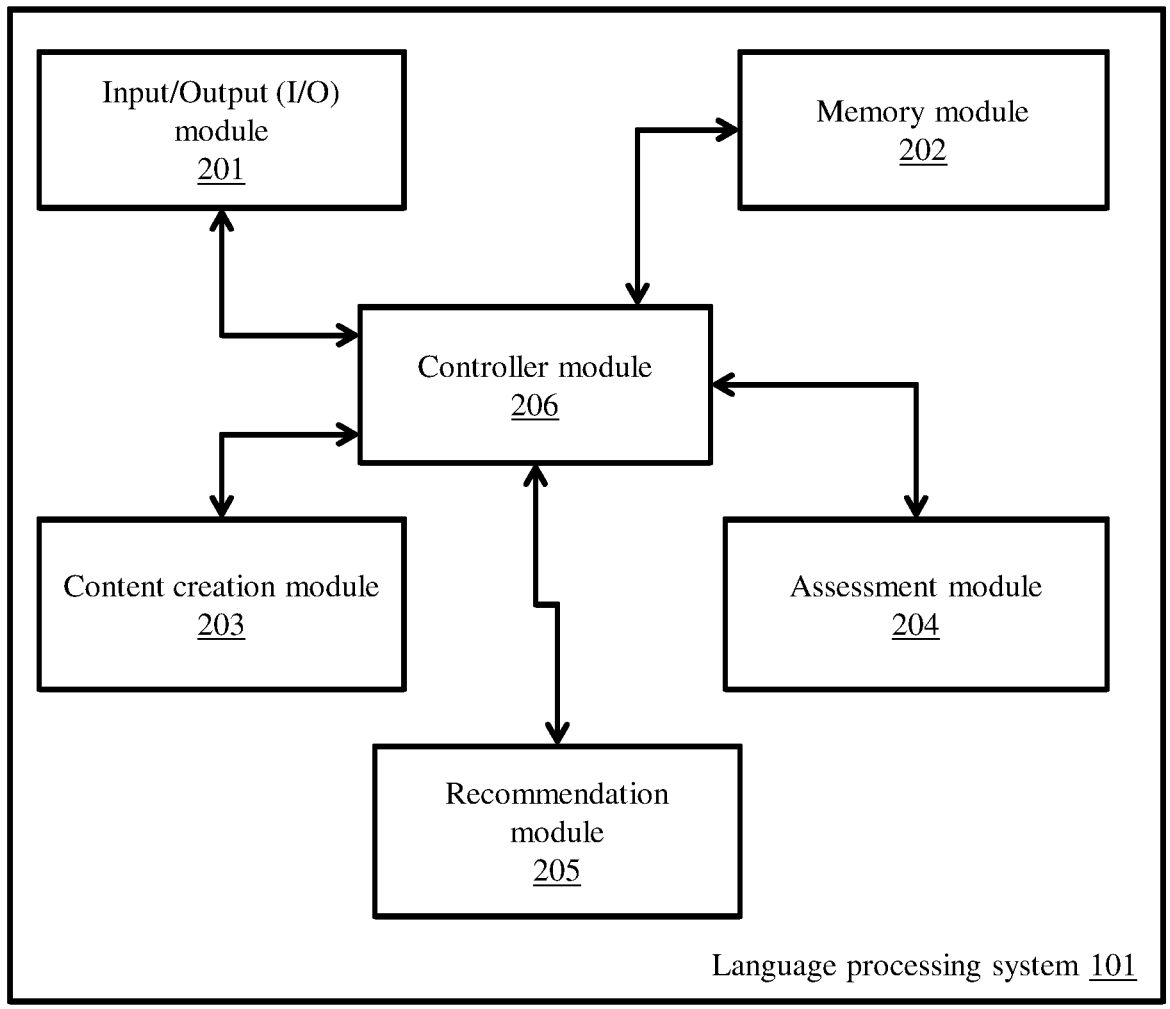
FIG. 2 is a block diagram that depicts components of the language processing system, according to some embodiments of the present disclosure.

FIG. 2 is a block diagram that depicts components of the language processing system, according to some embodiments of the present disclosure. The language processing system 101 includes an Input/Output (I/O) interface 201, a memory module 202, a content creation module 203, an assessment module 204, a recommendation module 205, and a controller module 206. The language processing system 101 includes at least one hardware processor, and a storage medium comprising instructions, wherein the instructions cause the hardware processor to perform the language processing, using the aforementioned components of the language processing system 101.

The I/O interface 201 is configured to provide one or more interfaces with suitable channels and corresponding communication protocols, for the language processing system 101 to interact with at least one external entity. The external entity can refer to a client device used by a user who is being monitored for language assessment, for receiving and sending data associated with the language processing mechanism. The interface module 201 is further configured to provide suitable interfaces for one or more users to directly interact with the language processing system 101. The I/O interface 201 can be further configured to provide suitable communication channels for all components of the language processing system 101 to communicate and exchange data each other.

The memory module 202 is configured to store different types of information associated with different functions being handled the language processing system. The memory module 202 stores information permanently or temporarily, as per-configured. For example, information such as but not limited to user profiles, language models, reference baseline of skill level, determined current skill level of each user, recommendation(s) provided to each user, and improvements detected over successive analysis are stored in the memory module 202. The memory module 202 is further configured to provide one or more of the stored information to other authorized modules of the language processing system 101, upon receiving corresponding requests.

The content creation module 203 is configured to generate, by collecting required inputs in suitable format, a language model, for the language assessment purpose. The content creation module 203 is further configured to generate customized exercises for language assessment of each user. The content creation module 203 is further configured to generate, for each customized exercise generated, at least one reference baseline of skill levels, wherein the reference baseline of skill levels indicates an ideal response to the customized exercise. The content creation module 203 is further configured to provide one or more of the generated data to one or more of the other modules of the language processing system 101, upon receiving corresponding authorized requests.

The assessment module 204 is configured to assess, by processing user response to one or more customized exercise, a current skill level of the user. The assessment module 204, while processing the user response, compares the user response with a reference baseline of skill level, and checks extent to which the data in the user response varies from the reference baseline of skill level. In an embodiment, the data representing the current skill level of the user, as well as the reference baseline of skill level are stored and processed in the form of tree data structure. In that case, suitable tree comparison technique(s) is used by the assessment module 204 while comparing the current skill level of the user and the reference baseline of skill level. Similarly, the data can be stored in other suitable formats, and accordingly, other suitable data processing techniques can be used. The assessment module 204, in terms of the comparison, determines a current skill level of the user, and then quantifies the current skill level. In an embodiment, quantifying the current skill level involves representing the current skill level in the form of a value. The assessment module 204 further compares the determined current skill level of the user with reference baseline skills level, and detects skill gap of the user, if any. The assessment module 204 further provides information pertaining to the detected skill gap to the recommendation module 205. In an embodiment, any suitable natural language processing techniques can be used by the language processing system 101 in order to process data. In another embodiment, a cognitive spatial distance measurement process is used to determine the extent to which the user response varies from the reference baseline.

The recommendation module 205, at least based on the skill gap information and the language model, determines at least one recommendation to help the user minimize and eliminate the skill gap. The recommendation module 205, using the content creation module 203, can generate customized contents to for language improvement of the user. In another embodiment, the recommendation module 205 can show real-time suggestions (when the user is editing the response to the exercise or when the user is compiling another write up) to prompt the user to make changes that would help reduce/eliminate the skill gap and accordingly improve language skills of the user. In another embodiment, the recommendation module 205, by collection information about various user specific parameters such as but not limited to common mistakes made by the user, identifies strong and weak aspects, and accordingly generates recommendations.

The controller module 206 is configured to coordinate functions as well as communications between other modules in the language processing system 101.

Figure 3:
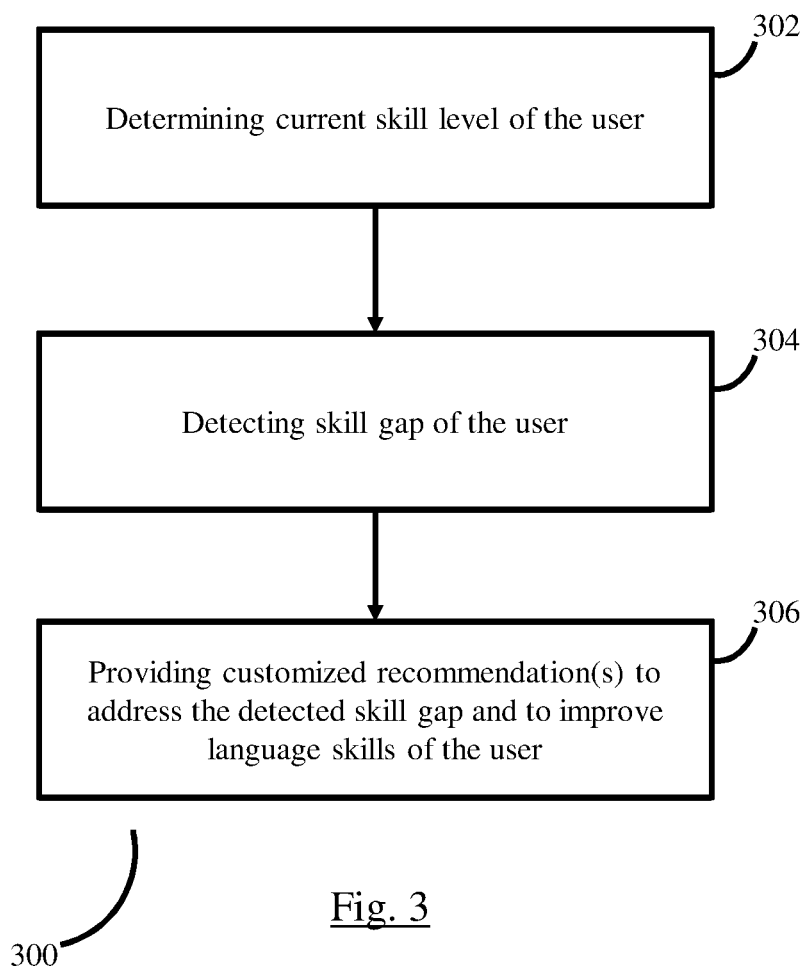
FIG. 3 is a flow diagram that depicts steps involved in the process of providing customized recommendations for language improvement of a user, using the language processing system, in accordance with some embodiments of the present disclosure.

FIG. 3 is a flow diagram that depicts steps involved in the process of providing customized recommendations for language improvement of a user, using the language processing system, in accordance with some embodiments of the present disclosure. Initially, a current skill level of the user is determined (302) by the language processing system by providing a customized exercise to the user. Further, the user response to the customized exercise is compared (304) with a reference baseline of skill level to determine extent to which the user response deviates from the reference baseline of skill level. Further, at least based on the skill gap and the language model relevant to the user, at least one customized recommendation is provided (306) to improve language of the user, and thus to eliminate the skill gap. The various actions in method 300 can be performed in the order specified, or in an alternate order, as per implementation requirements. Further, selected steps of FIG. 3 can be omitted if required.

Figure 4:
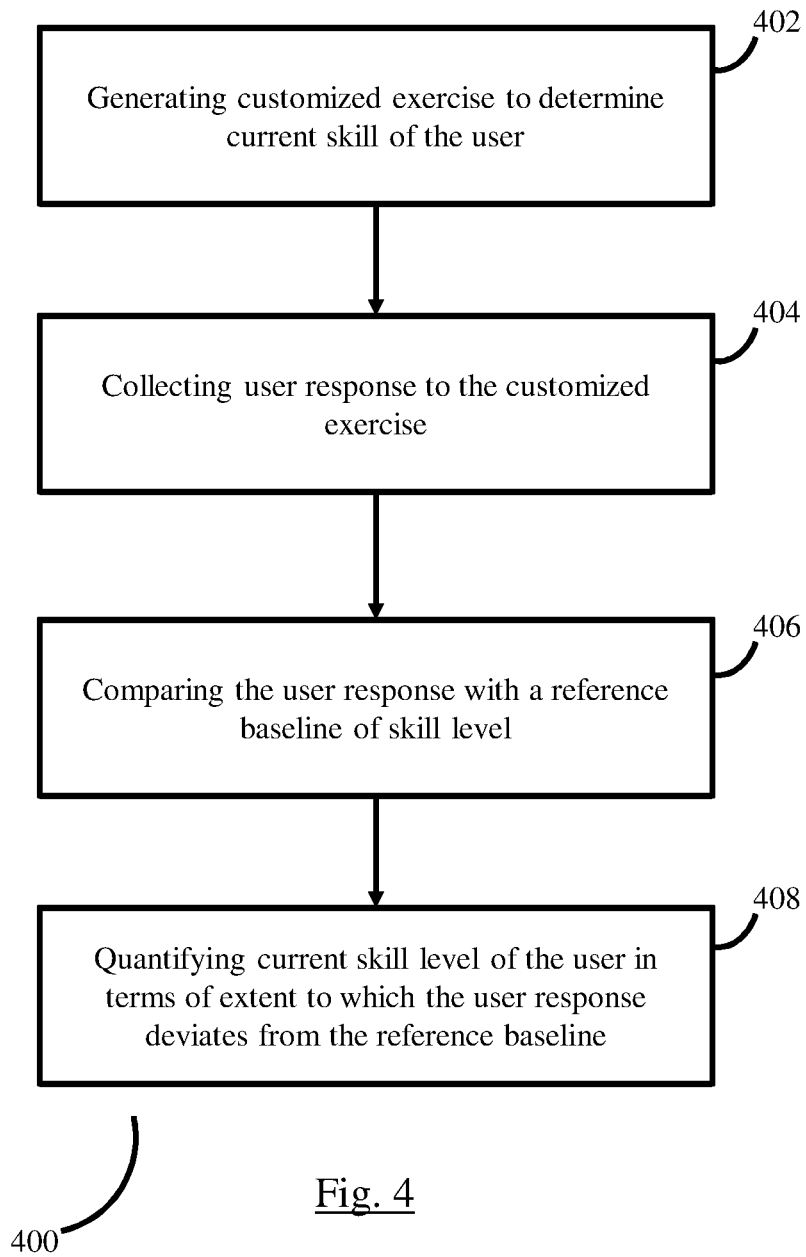
FIG. 4 is a flow diagram that depicts steps involved in the process determining current skill level of a user, using the language processing system, according to some embodiments of the present disclosure.

FIG. 4 is a flow diagram that depicts steps involved in the process determining current skill level of a user, using the language processing system, according to some embodiments of the present disclosure. In order to assess current skill level of a user, a customized exercise is generated (402), wherein the customized exercise is generated based on the language model relevant to the user. For example, a few sentences that are part of the language model form the exercise, and the user may be prompted to write down those sentences, as user response to the customized exercise. The user response is collected (404) by the language processing system 101, and the collected user response is compared (406) with a reference baseline of skill level, wherein the reference baseline represents an ideal response to the customized exercise, in terms of language specific rules that are part of the language model. In an embodiment, a cognitive spatial distance measurement is used to compare the user response and reference baseline of skill level. The process of comparing the user response and reference baseline of skill level is explained below by providing an example.

The process of comparing the user response to the customized exercise with the reference baseline of skill level using the cognitive spatial distance measurement is explained with the help of an example below.

Consider the table (Table. 1) below.

TABLE 1

| Position 1 | Position 2 | Position 3 | Position 4 |
|---|---|---|---|
| A | B | C | D |
| A | C | B | D |
| B | A | C | D |
| A | B | D | C |
| B | C | A | D |
| B | A | D | C |
| A | B | C | D |

Consider A, B, C and D are part of speech in a sentence with syntax as 1-2-3-4 i.e. the sentence ABCD. In the Table. 1, second row is reference baseline. Response to a corresponding exercise given to 6 users returned the results ACBD, BACD, ABDC, BCAD, BADC, and ABCD.

A has occurred at position 1 in 3/6 times, at position 2 in 2/6 times, at position 3 in 1/6 times, and at position 4 in 0/6 times. Similarly, B has occurred at position 1 in 3/6 times, at position 2 in 2/6 times, at position 3 in 1/6 times, and at position 4 in 0/6 times. C has occurred at position 1 in 0/6 times, at position 2 in 2/6 times, at position 3 in 2/6 times, and at position 4 in 2/6 times. As such, D has occurred at position 1 in 0/6 times, at position 2 in 0/6 times, at position 3 in 2/6 times, and at position 4 in 4/6 times.

That means the probabilities decrease as the Part of Speech (POS) moves away from its intended position. Ideal probability of a POS is one 1 at the intended position i.e. probability of A at position 1 should be 1, and same for other POS at their respective positions.

Here, in this case the radius of a POS would be till the position it occurs, wherein the radius represents a circle of ambiguity/confusion the user has of the actual position of the POS. If A occurs till position 3, then the radius of A would be 2 because ideally it should at position 1, then radius will be zero. Similarly radius for B would be the farthest position where B occurs, 1; radius of C will be 1 and D will be 1. Let's assume the radii of the four parts of speech for the sentence would r1, r2, r3, and r4.

In this example, the gradient for each POS is calculated as:

$$g(r)=f(d(r1,r2,r3,r4)) \qquad (1)$$

In the equation (1), d is the relationship between r1, r2, r3, and r4, and g(r) is the gradient of the part of speech. Thus, gradient of a part of speech is the relationship between radii of the sentence. 'd' could also mean combination of POS positions as mentioned in the table. Gradient of a POS could also mean the influence of one part of speech on other parts of speech.

Thus, for a single sentence, the total gradient would be the function of gradients of POS in that sentence. Thus, it could be represented as:

$$S=f(g) \qquad (2)$$

where S is the function of g.

The current skill level of the user is thus identified and quantified (408). The various actions in method 400 can be performed in the order specified, or in an alternate order, as per implementation requirements. Further, selected steps of FIG. 4 can be omitted if required.

Figure 5:
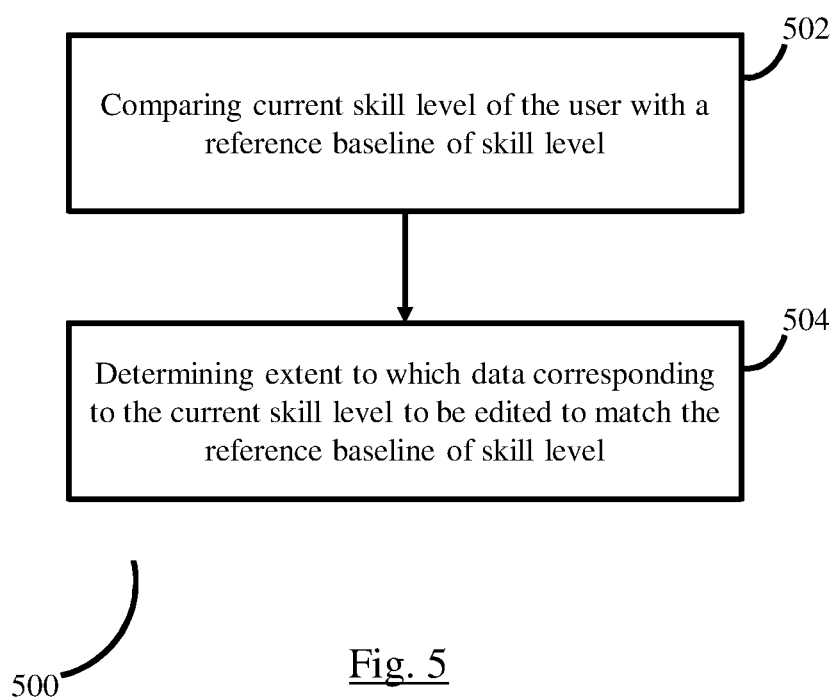
FIG. 5 is a flow diagram that depicts steps involved in the process of determining a skill gap of a user with respect to a reference baseline of skill level, using the language processing system, in accordance with some embodiments of the present disclosure.

FIG. 5 is a flow diagram that depicts steps involved in the process of determining a skill gap of a user with respect to a reference baseline of skill level, using the language processing system, in accordance with some embodiments of the present disclosure. This process is done to understand where the user stands in terms of language skills, as compared multiple other users. In order to assess this, the current skill level of the user is compared (502) with the reference baseline of skill level. By comparing the data, the skill gap is identified as the extent to which the current skill level of the user is to be improved to match with the reference baseline of skill level. In an embodiment, user response to previously presented customized exercises also may be considered to assess improvement in language skills of the user over a period of time. Recommendations for language improvement are determined to reduce/eliminate the detected skill gap. Along with recommendations, the language processing module 101, using the content creation module 203, can prepare learning module(s) that would help improve language skills of the user. While preparing the learning modules, the language processing module 101 can perform actions such as but not limited to determining whether exercises in the learning module belong to areas of improvement of the user, whether distribution of exercises in the learning module are in line with different categories reflected in determined skill gap of the user, finding out appropriate sentences and exercises for each category, and determination of appropriate length of sentences being included in the learning module.

In an embodiment, a scoring technique can be used to provide a rating to the user, in terms of the determined skill gap. Assume there are classes {c1, c2, c3 . . . cm} in a set C for the sentences from the reference baseline of skill level and current skill level of the user. For the given classes, weightages w1, w2, w3, . . . , wn are used. Thus, we assume that the sentences in a user response to the customized exercise either lies in the reference baseline or are grammatically incorrect. A class in which such grammatically incorrect sentences fall is represented as:

$$C'=\{c1',c2',c3',c4' \ldots cn'\} \qquad (3)$$

Now, Ci is a ration computed as:

$$Ci=(\text{Number of sentences in } Ci \text{ class})/(\text{Total number of sentences})$$

Now, a score 's' of the sentences for the users is obtained as result of multiplication of Ci and the weightage assigned to that class ci.

$$s = \begin{bmatrix} c1 \\ c2 \\ c3 \\ c4 \\ c5 \end{bmatrix} [w1 \ w2 \ w3 \ w4 \ w5] \qquad (4)$$

Similarly, score for the wrong sentences in the user response is obtained as:

$$s' = \begin{bmatrix} c1' \\ c2' \\ c3' \\ c4' \\ c5' \end{bmatrix} [w1 \ w2 \ w3 \ w4 \ w5] \qquad (5)$$

Thus, the score for the student write up would be will be S=s-s'. The score thus obtained is either positive, negative or zero. The scores thus calculated can be used to sort the users according ascending or descending order of their language skills.

The various actions in method 500 can be performed in the order specified, or in an alternate order, as per implementation requirements. Further, selected steps of FIG. 5 can be omitted if required.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for language development of a user, said method comprising:
    determining dynamically, via one or more hardware processors of a language processing system deployed on a cloud network, a current skill level of the user, using a cognitive spatial distance measurement, wherein determining the current skill level of the user using the cognitive spatial distance measurement comprises of:
        generating a customized exercise for the user by the language processing system deployed on the cloud network and providing the customized exercise using an Input/Output (I/O) interface, wherein the customized exercise is generated based on a language model relevant to the user, and wherein the generated customized exercise comprises sentences that are part of the language model relevant to the user, wherein the I/O interface is configured to provide one or more interfaces with communication channels and corresponding communication protocols for the language processing system deployed on the cloud network to interact with a client device used by the user, and wherein the language model is based on information pertaining to the language being learnt by the user, curriculum specific to the language and language specific rules;
        collecting user response for the customized exercise from the client device using the I/O interface, by the language processing system deployed on the cloud network, wherein collecting the user response comprises prompting the user to write the sentences, as the user response to the customized exercise;
        comparing the user response with a reference baseline of skill level, wherein the reference baseline of skill level represents an ideal response to the generated customized exercise in terms of the corresponding language model, wherein the ideal response is in line with the language specific rules that form the language model; and
        quantifying the current skill level of the user, based on extent to which the user response deviates from the reference baseline;
    detecting, via the one or more hardware processors, a skill gap of the user, wherein the skill gap is detected in terms of the determined current skill level and the reference baseline of skill level, wherein data representing the current skill level and the reference baseline of skill level are stored and processed in the form of a tree data structure, wherein the skill gap is detected as the extent to which the current skill level of the user is to be improved to match with the reference baseline of skill level;
    providing, via the one or more hardware processors, at least one recommendation in real-time for language improvement of the user and to reduce the detected skill gap, wherein the at least one recommendation is determined based on the detected skill gap, the language model and information about user specific parameters including common mistakes made by the user, strong and weak aspects, wherein the language model is specific to the language being learnt by the user, wherein the language model includes information pertaining to previous exercises and corresponding user responses such that mistakes made by the user in the previous exercises are considered while providing the at least one recommendation for language improvement of the user;
    generating, via the one or more hardware processors, learning modules along with the at least one recommendation to overcome the skill gap by determining whether exercises in the learning modules belong to areas of improvement of the user, determining whether distribution of exercises in the learning modules are in line with various categories reflected in the determined skill gap of the user, finding appropriate sentences and exercises for each category, and determining appropriate length of sentences being included in the learning modules; and
    performing, via the one or more hardware processors, periodic assessments to determine whether the at least one recommendation provided are improving the language skills of the user by comparing user response to the exercises in the learning modules with the user response of previous exercises.

2. The method as claimed in claim 1, wherein the extent to which data in the user response deviates from the reference baseline is determined in terms of at least one of Parts of Speech (POS), sentence structure, sentence syntax, and type of sentence, in said user response and said reference baseline.

3. A language processing system for language development of a user deployed on a cloud network, said language processing system comprising:
    at least one hardware processor; and
    a storage medium comprising a plurality of instructions, said plurality of instructions causing the at least one hardware processor to:
        determine dynamically, a current skill level of the user, using a cognitive spatial distance measurement, by an assessment module of the language processing system, wherein the current skill level of the user is determined using the cognitive spatial distance measurement by:
            generating a customized exercise for the user, by a content creation module of the language processing system deployed on the cloud network and providing the customized exercise using an Input/Output (I/O) interface, wherein the customized exercise is generated based on a language model relevant to the user, and wherein the generated customized exercise comprises sentences that are part of the language model relevant to the user, wherein the I/O interface is configured to provide one or more interfaces with communication channels and corresponding communication protocols for the language processing system deployed on the cloud network to interact with a client device used by the user, and wherein the language model is based on information pertaining to the language being learnt by the user, curriculum specific to the language and language specific rules;

collecting user response for the customized exercise from the client device, using the I/O interface, by the language processing system deployed on the cloud network, wherein collecting the user response comprises prompting the user to write the sentences, as the user response to the customized exercise;

comparing the user response with a reference baseline of skill level, by the assessment module, wherein the reference baseline of skill level represents an ideal response to the generated customized exercise in terms of the corresponding language model, wherein the ideal response is in line with the language specific rules that form the language model; and quantifying the current skill level of the user, based on an extent to which the user response deviates from the reference baseline, by the assessment module;

detect a skill gap of the user, by the assessment module, wherein the skill gap is detected in terms of the determined current skill level and the reference baseline of skill level, wherein data representing the current skill level and the reference baseline of skill level are stored and processed in the form of a tree data structure, wherein the skill gap is detected as the extent to which the current skill level of the user is to be improved to match with the reference baseline of skill level;

provide at least one recommendation in real-time for language improvement of the user and to reduce the detected skill gap, by a recommendation module of the language processing system, wherein the at least one recommendation is determined based on the detected skill gap, the language model and information about user specific parameters including common mistakes made by the user, strong and weak aspects, wherein the language model is specific to the language being learnt by the user, wherein the language model includes information pertaining to previous exercises and corresponding user responses such that mistakes made by the user in the previous exercises are considered while providing the at least one recommendation for language improvement of the user;

generate, via the one or more hardware processors, learning modules along with the at least one recommendation to overcome the skill gap by determining whether exercises in the learning modules belong to areas of improvement of the user, determining whether distribution of exercises in the learning modules are in line with various categories reflected in the determined skill gap of the user, finding appropriate sentences and exercises for each category, and determining appropriate length of sentences being included in the learning modules; and perform, via the one or more hardware processors, periodic assessments to determine whether the at least one recommendation provided are improving the language skills of the user by comparing user response to the exercises in the learning modules with the user response of previous exercises.

4. The language processing system as claimed in claim 3, wherein the extent to which data in the user response deviates from the reference baseline is determined in terms of at least one of Parts of Speech (POS), sentence structure, sentence syntax, and type of sentence, in said user response and said reference baseline.

5. One or more non-transitory machine readable information storage mediums comprising one or more instructions which when executed by one or more hardware processors causes:

determining dynamically, via one or more hardware processors of a language processing system deployed on a cloud network, a current skill level of the user, using a cognitive spatial distance measurement, wherein determining the current skill level of the user using the cognitive spatial distance measurement comprises of:

generating a customized exercise for the user by the language processing system deployed on the cloud network and providing the customized exercise using an Input/Output (I/O) interface, wherein the customized exercise is generated based on a language model relevant to the user, and wherein the generated customized exercise comprises sentences that are part of the language model relevant to the user, wherein the I/O interface is configured to provide one or more interfaces with communication channels and corresponding communication protocols for the language processing system deployed on the cloud network to interact with a client device used by the user, and wherein the language model is based on information pertaining to the language being learnt by the user, curriculum specific to the language and language specific rules;

collecting user response for the customized exercise from the client device using the I/O interface, by the language processing system deployed on the cloud network, wherein collecting the user response comprises prompting the user to write the sentences, as the user response to the customized exercise;

comparing the user response with a reference baseline of skill level, wherein the reference baseline of skill level represents an ideal response to the generated customized exercise in terms of the corresponding language model, wherein the ideal response is in line with the language specific rules that form the language model; and quantifying the current skill level of the user, based on extent to which the user response deviates from the reference baseline;

detecting, via the one or more hardware processors, a skill gap of the user, wherein the skill gap is detected in terms of the determined current skill level and the reference baseline of skill level, wherein data representing the current skill level and the reference baseline of skill level are stored and processed in the form of a tree data structure, wherein the skill gap is detected as the extent to which the current skill level of the user is to be improved to match with the reference baseline of skill level;

providing, via the one or more hardware processors, at least one recommendation in real-time for language improvement of the user and to reduce the detected skill gap, wherein the at least one recommendation is determined based on the detected skill gap, the language model and information about user specific parameters including common mistakes made by the user, strong and weak aspects, wherein the language model is specific to the language being learnt by the user, wherein the language model includes information pertaining to previous exercises and corresponding user responses such that mistakes made by the user in the previous exercises are considered while providing the at least one recommendation for language improvement of the user;

generating, via the one or more hardware processors, learning modules along with the at least one recommendation to overcome the skill gap by determining whether exercises in the learning modules belong to areas of improvement of the user, determining whether distribution of exercises in the learning modules are in line with various categories reflected in the determined skill gap of the user, finding appropriate sentences and exercises for each category, and determining appropriate length of sentences being included in the learning modules; and performing, via the one or more hardware processors, periodic assessments to determine whether the at least one recommendation provided are improving the language skills of the user by comparing user response to the exercises in the learning modules with the user response of previous exercises.

* * * * *